United States Patent

Asinovsky

[11] Patent Number: 5,763,985
[45] Date of Patent: Jun. 9, 1998

[54] COMPUTER HOUSING

[76] Inventor: Vladimir A. Asinovsky, 12322 Ella Lee La., Houston, Tex. 77077

[21] Appl. No.: 647,720

[22] Filed: May 13, 1996

[51] Int. Cl.⁶ .............................. A47B 97/00; G06F 1/16
[52] U.S. Cl. .................... 312/223.2; 312/223.3; 312/196; 361/683; 364/708.1
[58] Field of Search ........................... 312/223.2, 223.3, 312/194, 196, 208.1, 208.2, 208.3; 361/681, 683; 364/708.1; 345/905, 169

[56] References Cited

U.S. PATENT DOCUMENTS

| | | |
|---|---|---|
| 4,345,803 | 8/1982 | Heck . |
| 4,735,467 | 4/1988 | Wolters ........................ 312/223.3 X |
| 4,792,881 | 12/1988 | Wilson et al. . |
| 4,918,632 | 4/1990 | York ........................... 364/708.1 |
| 4,932,332 | 6/1990 | Noda ........................... 108/50 |
| 5,038,308 | 8/1991 | Le et al. ...................... 364/708.1 |
| 5,115,374 | 5/1992 | Hongoh ........................ 361/681 |
| 5,213,401 | 5/1993 | Hatcher . |
| 5,237,935 | 8/1993 | Newhouse et al. ............ 312/223.6 X |
| 5,429,431 | 7/1995 | Olson et al. .................. 312/223.6 |
| 5,440,450 | 8/1995 | Lau et al. . |
| 5,452,950 | 9/1995 | Crenshaw et al. . |
| 5,456,440 | 10/1995 | Sideris . |
| 5,461,974 | 10/1995 | Reneau . |
| 5,572,402 | 11/1996 | Jeong ........................... 364/708.1 X |

FOREIGN PATENT DOCUMENTS

| | | | |
|---|---|---|---|
| 3516855 | 11/1986 | Germany ..................... 312/223.3 |
| 4115151 | 11/1992 | Germany ..................... 312/223.3 |
| 84618 | 5/1985 | Japan ........................... 312/223.3 |
| 403004294 | 1/1991 | Japan ........................... 345/905 |
| 403011412 | 1/1991 | Japan ........................... 361/683 |

*Primary Examiner*—Peter M. Cuomo
*Assistant Examiner*—Hanh V. Tran
*Attorney, Agent, or Firm*—Joseph N. Breaux

[57] ABSTRACT

A computer housing that includes a case assembly that is adapted to cover the work area of an office furnishing such as a desk, counter, credenza or table. The case assembly has a height of less four inches, and includes a top surface having a housing work surface portion that is substantially planar, at least one side panel having an access opening therethrough into a component chamber defined by the case assembly, a guide mechanism positioned within the component chamber and oriented with respect to the access opening in a manner to direct insertion of a computer hardware element through the access opening and into connection with a hardware interconnect assembly.

5 Claims, 3 Drawing Sheets

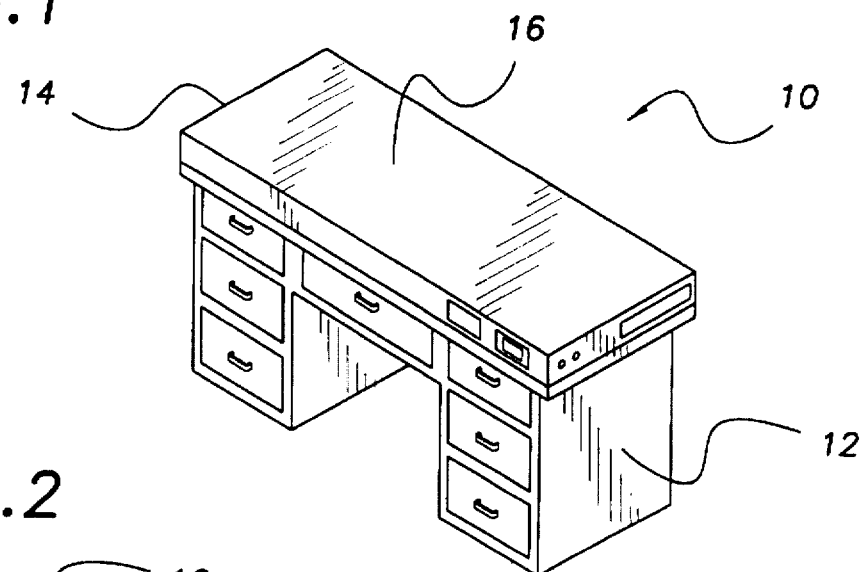
FIG. 1
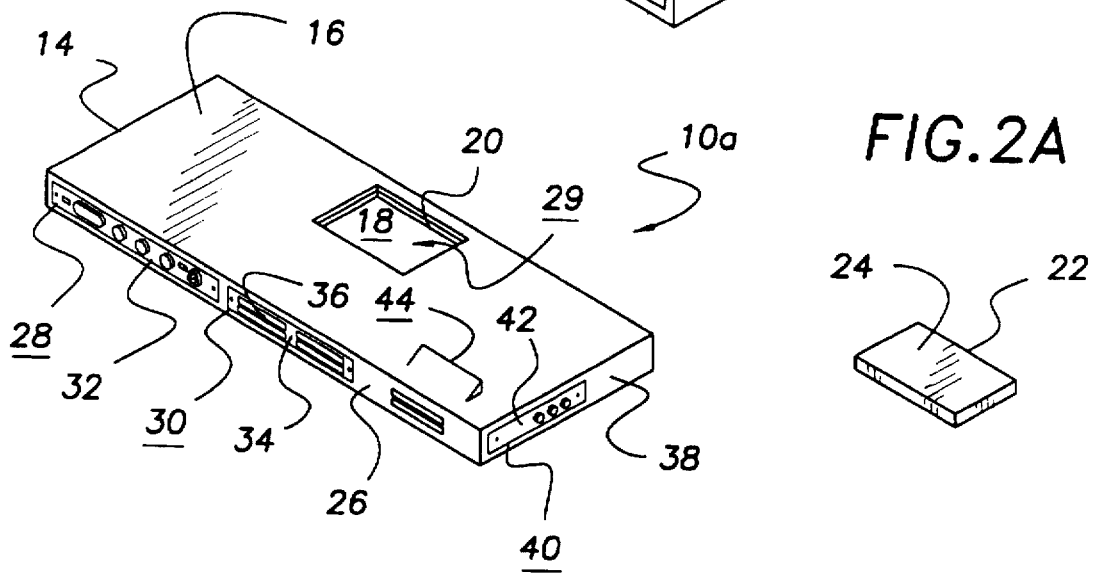
FIG. 2
FIG. 2A
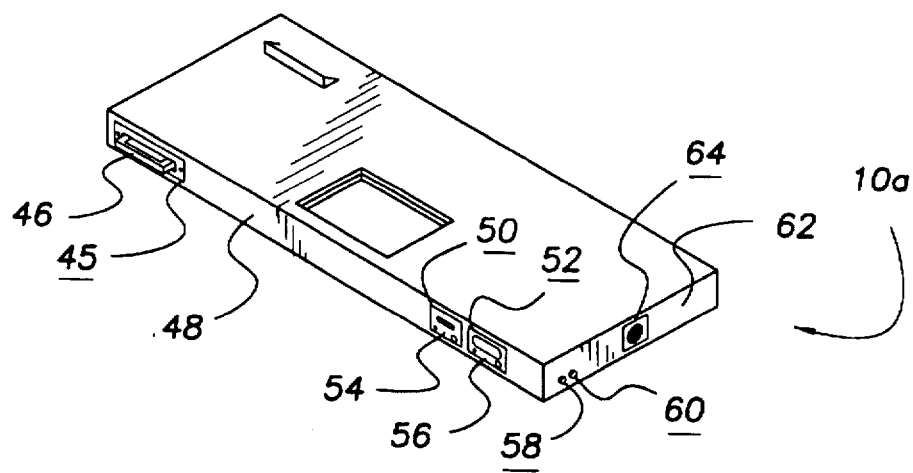
FIG. 3

COMPUTER HOUSING

TECHNICAL FIELD

The present invention relates to housings for personal computers and more particularly to a computer housing adapted to cover a large area of a traditional office work surface, such as provided by an office furnishing such as a desk, credenza, counter or table, having a housing work surface on a top portion thereof substantially equal to the area of traditional office work surface provided by the office furnishing.

BACKGROUND ART

Office work surfaces are traditionally provided by such furnishings as desks, credenzas, counters and tables. These furnishings provide a substantially planar top surface upon which work may be carried out. The introduction and growing acceptance of personal computers in the work area has led to the placement of personal computers and the peripheral devices associated with personal computers, such as displays and printers, on a growing number of traditional office work surfaces. Placement of a personal computer and its associated peripheral devices onto the typical office work surface obstructs the area of work surface available for workers to utilize in the ordinary course of performing their duties. This reduced working surface area can lead to worker frustration and stress.

One solution to increasing the work surface area available to a worker is to introduce an additional office furnishing work surface into the work area. However, these furnishings can be expensive. In addition, the only available location for placing the new office furnishing is often inconvenient for the worker and placement of the furnishing in an inconvenient location can require the worker to perform multiple additional movements such as twisting or turning to view documents or utilize other work related items. Providing additional office furnishings, therefore, has its drawbacks.

A better solution would be to have a computer housing that could be placed on top of the traditional office furnishing work surface without obstructing the effective working surface available to the worker stationed at the work surface. It would be a benefit, therefore, to have a computer housing that could be placed on top of traditional office furnishings such as desks, credenzas, counters and tables with minimal obstruction of the effective work surface provided by the furnishing. Because peripheral devices, such as printers and displays, also obstruct the effective work surface of traditional office furnishings, it would be a further benefit if the computer housing included addition space therein for housing such peripherals with minimal obstruction of the housing work surface.

GENERAL SUMMARY DISCUSSION OF INVENTION

It is thus an object of the invention to provide a housing for a personal computer that includes a housing work surface.

It is a further object of the invention to provide a housing for a personal computer that includes a housing work surface that is less than four inches above the office furnishing work surface upon which the computer housing is positioned.

It is a still further object of the invention to provide a housing for a personal computer that includes areas therein for receiving peripheral devices associated with the computer such as printers and displays.

It is a still further object of the invention to provide a housing for a personal computer that accomplishes all or some of the above objects in combination.

Accordingly, a computer housing is provided. The computer housing includes a case assembly defining a component chamber therein, the case assembly dimensionally having a height of less than four inches, a width of at least twenty-four inches, and a depth of at least eighteen inches, the case assembly further including a top surface including a housing work surface portion that is substantially planar, at least one side panel having an access opening therethrough into the component chamber, a guide mechanism positioned within the component chamber and oriented with respect to the access opening in a manner to direct insertion of a computer hardware element through the access opening and into connection with a hardware interconnect assembly. The term "housing work surface portion" is used herein to mean a surface suitable for placing thereon documents and other articles commonly found on an office working surface such as staplers, tape dispensers, name plates, telephones, desk pads, etc. The term "hardware interconnect assembly" is used herein to mean an electrical, magnetic, optical, or hybrid interconnection assembly including component connectors required to interconnect the desired hardware elements of the computer.

The computer housing is preferably manufactured to width and depth dimensions such that the computer housing completely covers the top of the entire work surface of the office furnishing upon which it is placed and, more preferably, is dimensioned such that in use the computer housing covers a standard desk top or standard credenza top. The computer housing is preferably of the smallest height possible, and preferably less than two inches. The computer housing, therefore, adds only minimally to the distance between the work surface and the floor and does not obstruct the working area provided to the worker. The top surface is preferably constructed from conventional desk top materials such as wood, glass, plastic and metal, however, any material having a surface hard enough to function as a desk top can be used.

In a preferred embodiment, the computer housing includes an additional access panel opening through which a printing device may be installed and a paper port oriented with respect to the additional access panel opening in a manner to allow paper to be ejected from the component compartment to the exterior of the computer housing by the printing device.

In another preferred embodiment, the top surface of the computer housing has a display receiving compartment formed therein for mounting a substantially flat visual display device such as a liquid crystal display (LCD) to the computer housing. When a display receiving compartment is provided, a cover plate is provided that can be used to cover the display receiving compartment. When the cover plate is installed, the outer surface of the cover plate is preferably flush with the top surface of the computer housing so as not to obstruct the area encompassed by the housing work surface portion. Of course additional receiving compartments can be provided within the top surface for receiving peripheral devices such as digitizing pads, trackballs, etc. In addition, it is also desirable to provide at least one conduit channel through the case assembly that passes through the top surface to allow telephone cables and the like to pass through the case assembly to the top surface for use.

In another preferred embodiment, the case assembly includes an oversized portion that extends along a side thereof that has a height dimension greater than the nominal height dimension of the remainder of the computer housing. The oversized portion preferably extends away from a bottom surface of the computer case. Inclusion of an oversized portion allows hardware elements having a height dimension greater than the nominal height of the computer case to be installed within the computer housing. Thus the requirement for a special hardware element will not prevent the use of the computer housing of the present invention or require expensive engineering changes to the hardware element before the hardware element can be used.

In another preferred embodiment, the oversized portion includes a covered access opening through a section of the top surface and is adapted to receive therein a visual display device in a manner such that the visual display device may be extended from the oversized compartment for use and retracted back into the oversized compartment for storage out of the way when not needed.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 a perspective view showing a first exemplary embodiment of the computer housing of the present invention positioned atop a conventional desk.

FIG. 2 is a perspective view of a second exemplary embodiment of the computer housing of the present invention showing an optional display receiving compartment and an optional printer paper output port on the working surface of the computer housing and a printer insert panel installed in a first side panel of the computer housing, and a peripheral attachment insert panel, and a motherboard insert panel installed in the rear side panel of the computer housing.

FIG. 2A is a perspective view showing an exemplary cover plate that is adapted to fit within the display receiving compartment.

FIG. 3 is a second perspective view of the exemplary computer housing of FIG. 2 showing the printer paper tray, a floppy disk drive and a compact disc drive installed in a front panel of the computer housing, and a cooling fan installed in a second side panel of the computer housing.

EXEMPLARY MODE FOR CARRYING OUT THE INVENTION

Figure 4:
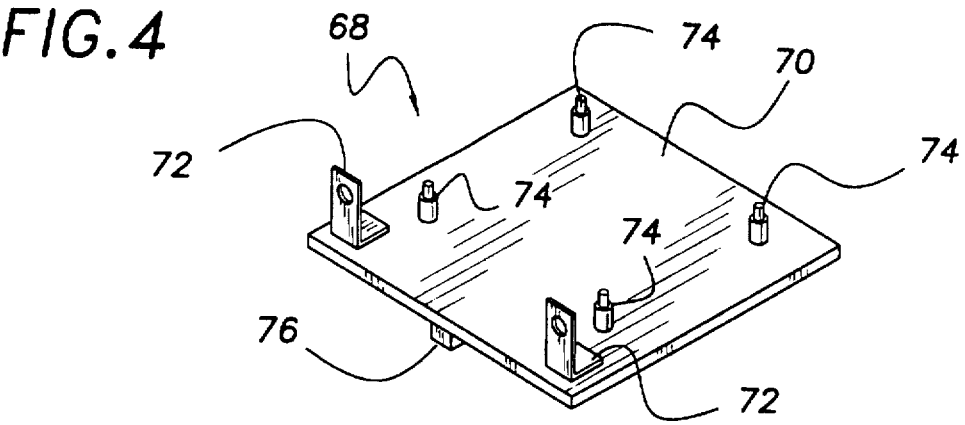
FIG. 4 is a perspective view of an exemplary mounting drawer that can be supplied with the computer housing if desired. The exemplary mounting drawer is shown with the panel removed showing a pair of L-shaped panel brackets, four circuit board support stanchions and a guide bar.

FIG. 1 shows a first exemplary embodiment of the computer housing of the present invention, generally designated by the numeral 10, in place on top of a representative office desk 12. In this embodiment, case assembly 14 is a substantially rectangular, seventy-one inch wide, thirty-five inch deep, two and one-half inch high box constructed from sheet metal to define a component compartment therein for receiving the necessary hardware elements of the computer. Case assembly 14 has a top surface 16—the entire area of which forms a housing work surface portion that is substantially planar.

FIG. 2 shows a second exemplary computer housing 10a having a top surface 16 into which is formed a display receiving compartment 18 having a perimeter ledge 20 around the inner perimeter thereof for mounting a visual display device such as a liquid crystal display (LCD) to computer housing 10a. Although a ledge 20 is used to support the visual display device in this embodiment other support methods that support the visual display within display receiving compartment 18 can be used. With reference to FIG. 2A, a metal cover plate 22 is provided that fits within display receiving compartment 18 to cover display receiving compartment when an alternate visual display device is used. When cover plate 22 is installed, an outer surface 24 of cover plate 22 is flush with top surface 16.

With reference once again to FIG. 2, a first side panel 26 is provided along a back side of case assembly 14. First side panel 26 has a pair of access openings 28,30 formed therethrough into component chamber 29. Access opening 28 is covered with a peripheral interconnect panel 32. Access opening 30 is covered with a vent panel 34 having four vent openings 36 for providing cooling air access into the component compartment. Peripheral interconnect panel 32 and vent panel 34 are both removable to insert and remove computer hardware elements.

A second side panel 38 has a printer insertion opening 40 into which a printer unit 42 is installed. Paper is ejected from printer unit 42 through a paper port 44. With reference to FIG. 3, a paper feed opening 45 is provided in a front panel 48. As shown in the figure, a paper feed tray 46 can be installed within paper feed opening 45 to feed paper to printer unit 42.

Disk drive openings 50,52 are also provided in front panel 48 for receiving a floppy disk drive 54 and a compact disk drive 56. A power switch opening 58 and a reset switch opening 60 are provided on a second side panel 62. A cooling fan opening 64 is also provided through second side panel 62.

Figure 4A:
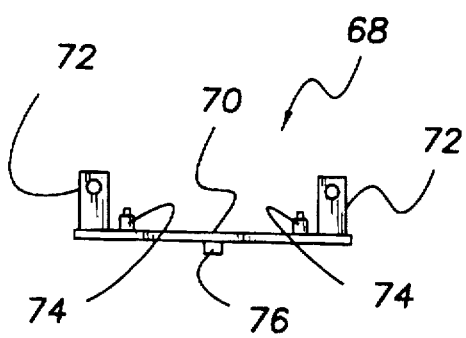
FIG. 4A is a front plan view of the exemplary mounting drawer of FIG. 4 showing the two L-shaped panel brackets, two of the four circuit board stanchions and the guide bar.
Figure 4B:
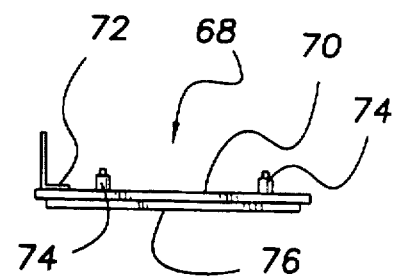
FIG. 4B is a side plan view of the exemplary mounting drawer of FIG. 4 showing one of the two L-shaped panel brackets, two of the four circuit board stanchions and the guide bar.

FIGS. 4, 4A and 4B show an exemplary hardware mounting drawer, generally designated by the numeral 68, that can be provided with computer housing 10a if desired. The desired computer hardware elements are secured to a mounting drawer 68 and then inserted through access openings 28,30 into component chamber 29 when assembling or repairing the computer. In this embodiment, mounting drawer 68 includes a base plate 70, a pair of L-shaped panel brackets 72, four circuit board support stanchions 74, and a guide bar 76.

Figure 5:
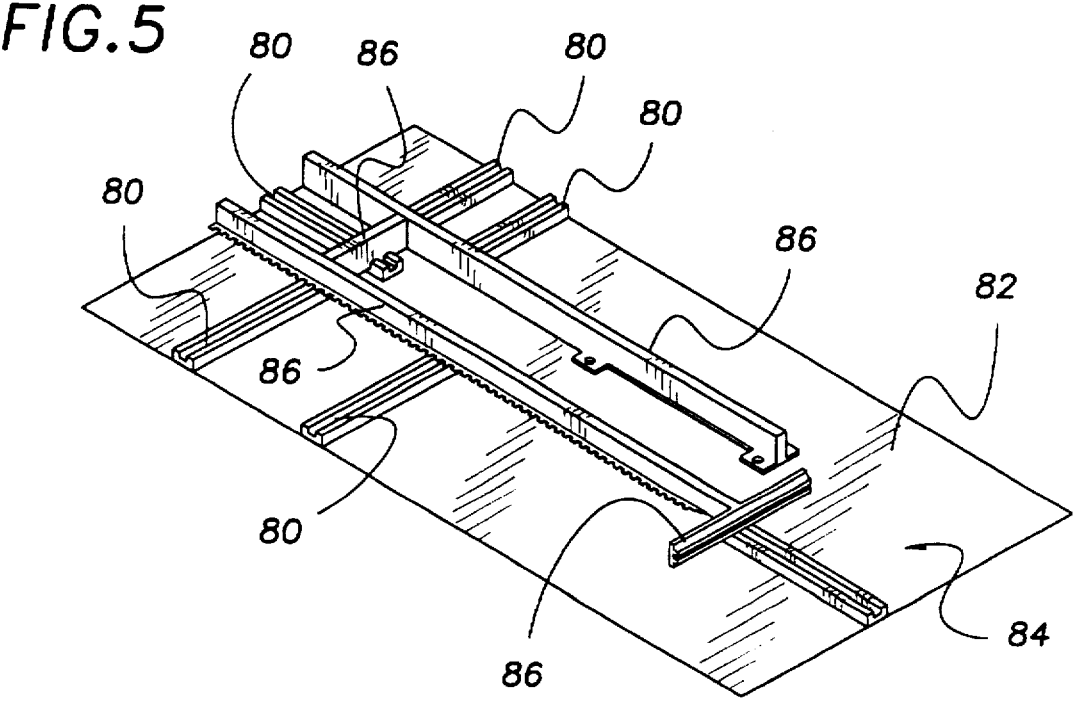
FIG. 5 is a perspective view of an exemplary circuit board connecting assembly of the computer housing including a housing base, four electrically interconnected board insertion slots and six guide channels adapted to slidingly receive a guide bar of a mounting drawer.

With reference to FIG. 5, guide bar 76 is slidable within one of six guide channels 80 mounted to a housing base portion 82 and oriented perpendicularly with respect to the access openings. Housing base portion 82 partially defines component compartment 29. Guide channels 80 make up part of a circuit board connecting assembly, generally designated by the numeral 84, that is installed within component compartment 29. Circuit board connecting assembly 84 includes four electrically interconnected board insertion slots 86 that are wired in the conventional manner to interconnect the desired hardware elements of the computer.

Figure 6:
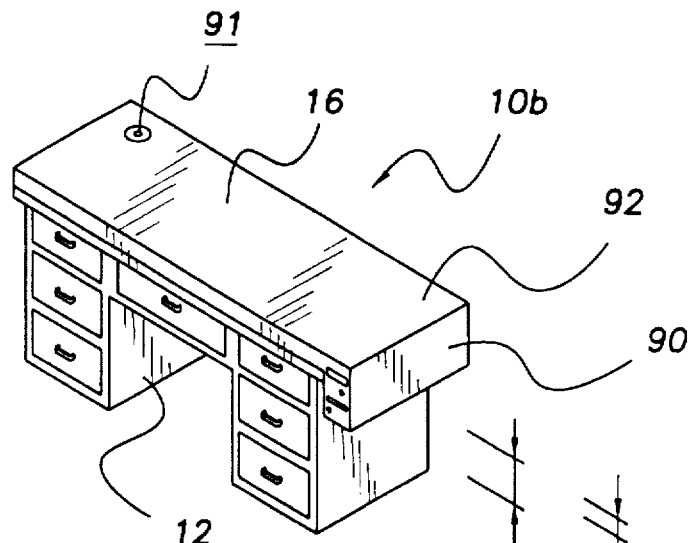
FIG. 6 is a perspective view of a third exemplary computer housing showing an overhanging portion adapted to receive oversize components that are designed for use with a conventional personal computer.

FIG. 6 shows a third exemplary computer housing 10b positioned on top of exemplary desk 12. In this embodiment an oversized portion 90 is provided along a side 92 thereof. In this embodiment, oversized portion 90 has a height dimension "A" of five inches. The nominal height dimension "B" of the remainder of computer housing 10b is two inches. Computer housing 10b is also provided with a conduit channel 91 therethrough that passes through top surface 16 and provides a passageway through which a telephone cable or the like to pass through computer housing 10b to top surface 16.

Figure 7:
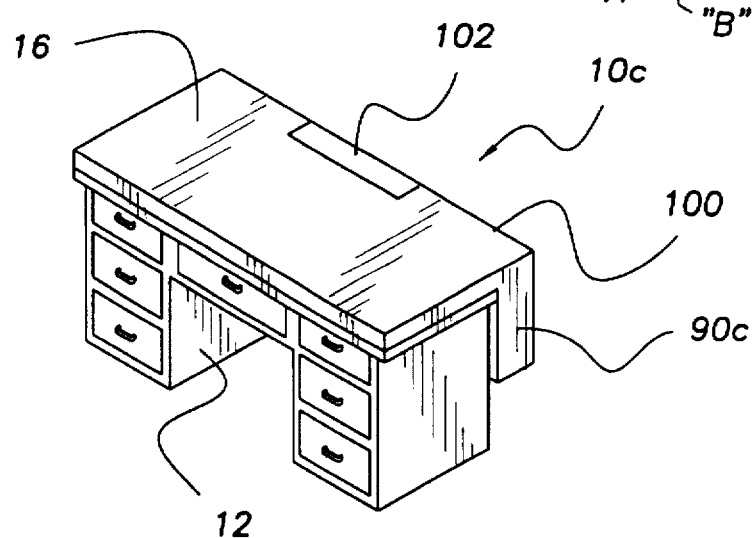
FIG. 7 is a perspective view of a fourth exemplary computer housing showing an overhanging portion provided along the front edge of the computer housing.
Figure 7A:
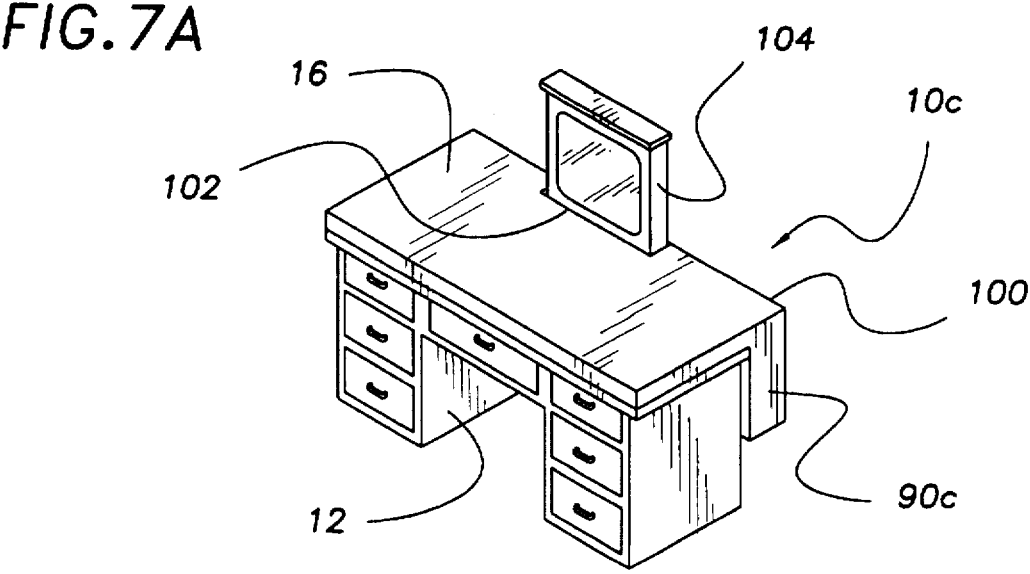
FIG. 7A a second perspective view of the fourth exemplary computer housing shown in FIG. 7.

FIG. 7 shows a fourth exemplary computer housing 10c positioned on top of exemplary desk 12. In this embodiment oversized portion 90c is provided along the front side 100 thereof. A covered access opening 102 is provided through a section of top surface 16 located over oversized portion 90c. As shown in FIG. 7A oversized portion 90c is adapted to receive therein a visual display device 104 in a manner such that visual display device 104 can be deployed through covered access opening 102.

It can be seen from the preceding description that a housing for a personal computer has been provided that includes a housing work surface; that includes a housing work surface that is less than four inches above the office furnishing work surface upon which the computer housing is positioned; and that includes areas therein for receiving peripheral devices associated with the computer such as printers and displays.

It is noted that the embodiment of the computer housing described herein in detail for exemplary purposes is of course subject to many different variations in structure, design, application and methodology. In particular, the hardware components may be mounted and interconnected within the computer housing in any of the methods conventionally known in the art and the shape of the computer housing can be adapted to register with the perimeter of any working surface and can be provided in a variety of shapes including elliptical, polygonal, round, and any irregular shape. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A computer housing comprising:

a case assembly defining a component chamber therein, said case assembly dimensionally having a height of less than four inches, a width of at least twenty-four inches, and a depth of at least eighteen inches, said case assembly further including a top surface including a housing work surface portion that is substantially planar, at least one side panel having at least one access openings therethrough into said component chamber, a guide mechanism positioned within said component chamber and oriented with respect to said access opening for directing insertion of a computer hardware element through said access opening;

said case assembly including an oversized portion defining a component compartment that extends along a side thereof that has a height dimension greater than the height dimension of said component chamber.

2. The computer housing of claim 1, wherein:

said oversized portion extends away from a bottom surface of said case assembly.

3. The computer housing of claim 1, further including:

a covered access opening through a section of said top surface over said oversized portion.

4. The computer housing of claim 3, wherein:

said oversized portion is adapted to receive therein a visual display device in a manner such that said visual display device may be deployed through said covered access opening.

5. The desk top computer housing of claim 1, wherein:

said case assembly having a conduit channel formed therethrough that passes through said housing work surface portion.

* * * * *